(12) United States Patent
Vigild et al.

(10) Patent No.: US 8,245,499 B2
(45) Date of Patent: Aug. 21, 2012

(54) CONTROL METHOD FOR TEMPORARILY INCREASING THE EXHAUST GAS TEMPERATURE

(75) Inventors: Christian Winge Vigild, Aldenhoven (DE); Johannes Kuenstler, Juelich (DE); Daniel Roettger, Eynatten (BE); Evangelos Karvounis, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 587 days.

(21) Appl. No.: 12/333,386

(22) Filed: Dec. 12, 2008

(65) Prior Publication Data

US 2009/0151333 A1 Jun. 18, 2009

(30) Foreign Application Priority Data

Dec. 13, 2007 (DE) .................. 10 2007 060 142

(51) Int. Cl.
*F01N 3/00* (2006.01)
(52) U.S. Cl. ............ 60/285; 60/274; 60/289; 60/291; 60/324
(58) Field of Classification Search .......... 60/274, 60/284–287, 289, 291, 292
See application file for complete search history.

(56) References Cited

U.S. PATENT DOCUMENTS

| | | | |
|---|---|---|---|
| 6,109,027 A * | 8/2000 | Schaefer | 60/324 |
| 6,138,649 A * | 10/2000 | Khair et al. | 123/568.12 |
| 6,179,096 B1 * | 1/2001 | Kinerson et al. | 188/154 |
| 6,230,682 B1 * | 5/2001 | Gustafsson et al. | 123/323 |
| 6,817,174 B1 * | 11/2004 | Igarashi et al. | 60/295 |
| 6,945,236 B2 * | 9/2005 | Nakai et al. | 123/568.12 |
| 7,047,933 B2 * | 5/2006 | Gray, Jr. | 123/305 |
| 7,131,271 B2 * | 11/2006 | Bulicz et al. | 60/605.2 |
| 7,340,886 B2 * | 3/2008 | Kawashima et al. | 60/295 |
| 7,681,394 B2 * | 3/2010 | Haugen | 60/603 |
| 7,717,099 B2 * | 5/2010 | Nagae et al. | 123/568.21 |
| 7,921,639 B2 * | 4/2011 | Silbermann et al. | 60/278 |
| 8,006,494 B2 * | 8/2011 | Nagae | 60/605.2 |
| 2004/0221831 A1 * | 11/2004 | Chmela et al. | 123/301 |
| 2007/0125081 A1 * | 6/2007 | Czarnowski et al. | 60/599 |
| 2007/0204598 A1 * | 9/2007 | Wirth et al. | 60/278 |
| 2009/0038308 A1 * | 2/2009 | Nagae | 60/602 |
| 2009/0063023 A1 * | 3/2009 | Nagae | 701/108 |

FOREIGN PATENT DOCUMENTS

EP 0521411 A1 6/1992

* cited by examiner

*Primary Examiner* — Thomas Denion
*Assistant Examiner* — Jesse Bogue
(74) *Attorney, Agent, or Firm* — Julia Voutyras; Alleman Hall McCoy Russell & Tuttle LLP

(57) ABSTRACT

The invention relates to a control method for increasing the exhaust gas temperature of an internal combustion engine by increasing the exhaust back-pressure, yet maintaining an exhaust gas recirculation rate. Further, the fuel injection quantity of a main injection into the engine is increased. In this way, it is possible to increase the temperature of the exhaust gas and avoid engine oil dilution due to retarded post-injections.

5 Claims, 4 Drawing Sheets

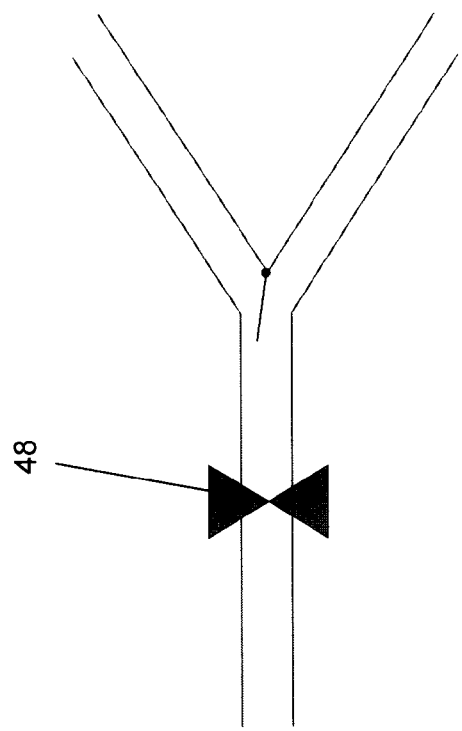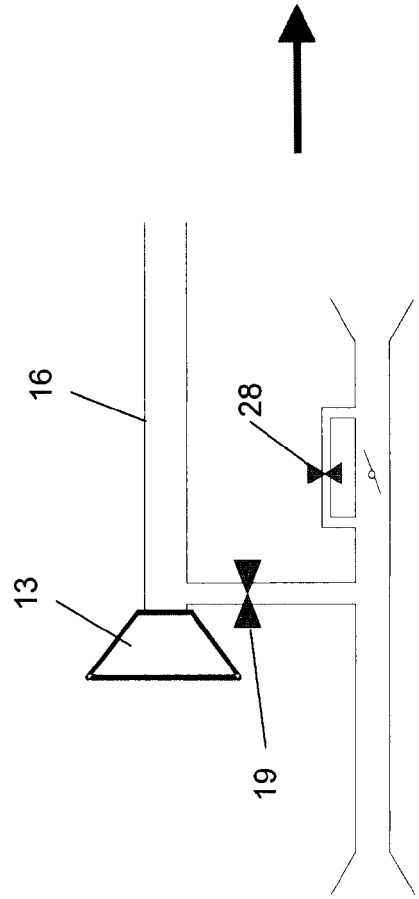
Fig. 3

CONTROL METHOD FOR TEMPORARILY INCREASING THE EXHAUST GAS TEMPERATURE

BACKGROUND AND SUMMARY OF THE INVENTION

The invention relates to a control method for increasing the exhaust gas temperature of an internal combustion engine, which has at least one exhaust gas aftertreatment device in its exhaust tract, and which has an exhaust gas recirculation system, to which a regulating system is assigned.

EP 0 521 411 A1 discloses an exhaust gas pipe of an internal combustion engine, having at least one catalytic converter arranged in the exhaust pipe, and an adjustable throttle element arranged in said pipe. The throttle element is arranged with a fixed upstream end adjacent to a side wall of the exhaust pipe. A moveable downstream end is arranged so as to form a gap between it and an opposing side wall when the internal combustion engine is cold.

U.S. Pat. No. 7,131,271 B2 is concerned with a method for controlling a low-pressure exhaust gas recirculation of an internal combustion engine. The exhaust gas recirculation system has a throttle valve and an exhaust gas recirculation valve. Control of the two valves is coordinated by a central control unit, so that the respective valve is adjusted selectively. If the throttle valve is closed, the exhaust gas recirculation valve is simultaneously opened due to the pressure build-up.

Internal combustion engines usually have exhaust gas aftertreatment devices, such as catalytic converters and particle filter, such as a diesel particle filter, in their exhaust tract. These exhaust gas aftertreatment devices are known to need a certain exhaust gas temperature level in order to reduce CO in the exhaust gas, for example, or in the case of the diesel particle filter in order to be able to perform a required regeneration. For example, the exhaust gas temperature can be increased by means of a post-injection of fuel into the combustion chamber. This post-injection is performed after a timed main injection, usually fixed briefly before or after the top dead center of the piston. One problem of post-injection is that a proportion of the additional fuel injected is not burned, but is precipitated on the inside walls of the cylinder and can get into the engine oil. The disadvantage of an unwanted dilution of the engine oil with fuel thereby has to be accepted in order to obtain the advantage of an increase in the exhaust gas temperature.

Conventional intake and exhaust systems of an internal combustion engine require extensive control and calibration, in order to ensure an acceptable performance both during dynamic operation of the engine and in stationary operation. A major problem, especially in the case of diesel engines, is the extremely difficult coupling between the exhaust gas recirculation control and the separate boost pressure control. This means that it is currently not possible to regulate one of the two parameters without upsetting or having a detrimental effect on the adjustment of the other parameter. Instead both parameters have to be monitored and/or adjusted in parallel. This requires separate control elements for each of them, which have to be adjusted separately and which are extremely cost-intensive.

This invention is directed to providing a control method for increasing the exhaust gas temperature, in which dilution of the engine oil can be largely avoided.

According to the invention, the regulating system increases the exhaust gas back-pressure, whilst maintaining an exhaust gas recirculation rate, and a fuel injection quantity into the combustion chamber is here increased during the main injection, and/or the main injection is deferred to a later time.

In another embodiment of the present invention, the system increases the fuel injection quantity, followed by deferring the main injection if the required exhaust gas temperature or the required exhaust gas temperature level is not achieved via increased fuel injection. In an alternative embodiment, it is beneficial to defer the main injection to a later time, without increasing the exhaust gas back-pressure. In yet another embodiment of the present invention, it is also beneficial to defer the main injection to a later time, followed by possible increases in the exhaust gas back-pressure and the fuel injection quantity.

BRIEF DESCRIPTION OF THE DRAWINGS

Further advantageous developments of the invention are disclosed in the dependent claims and in the following description of the drawings, in which FIG. 3 shows a schematic drawing representing the design principle of an aggregate area for two valves.

DESCRIPTION OF THE PREFERRED EMBODIMENTS

Figure 1:
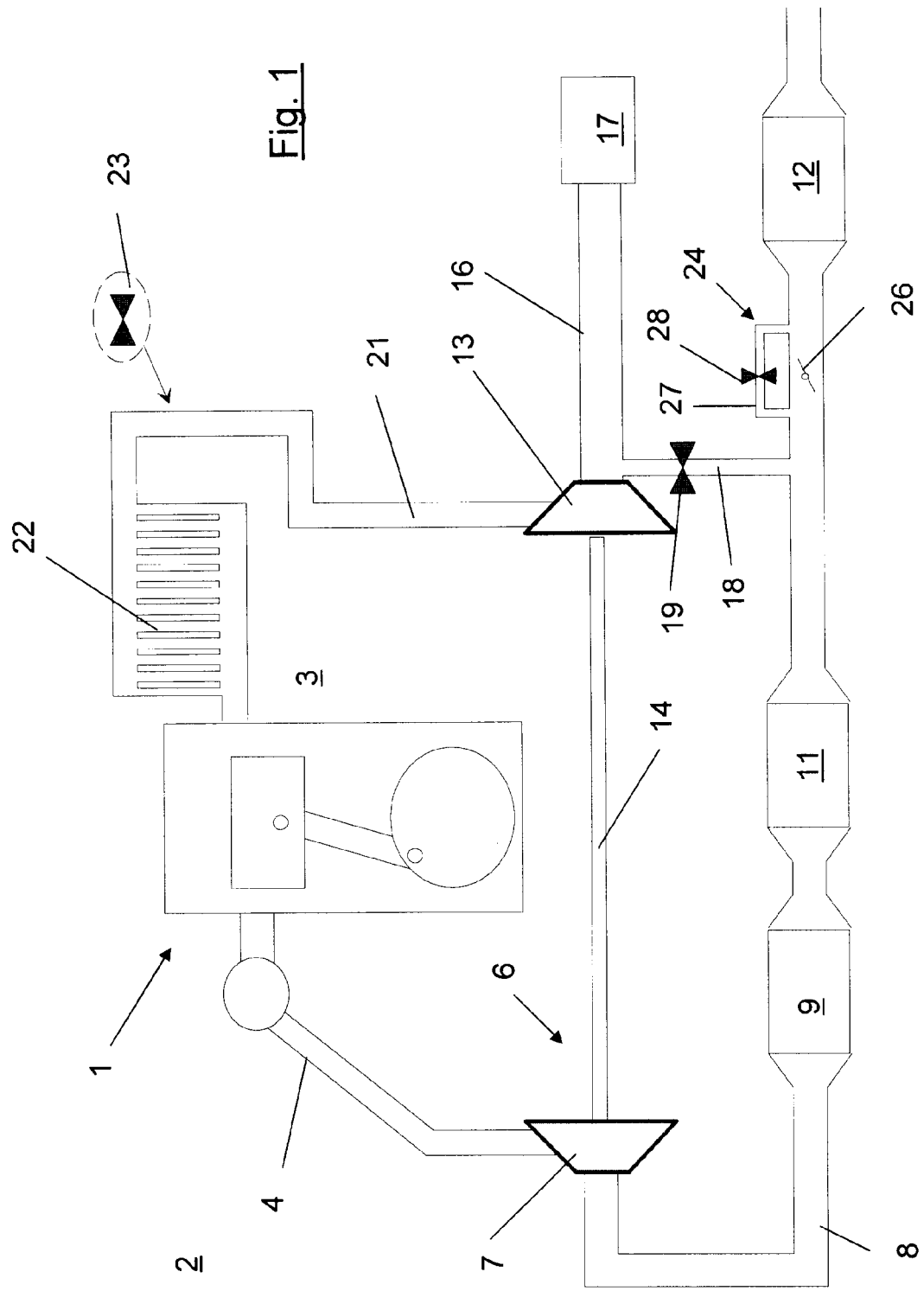
FIG. 1 shows a schematic drawing of a turbocharged internal combustion engine with exhaust gas recirculation.

In the respective drawings, the same parts are always provided with the same reference numerals, for which reason these parts are generally described only once.

FIG. 1 shows a turbocharged internal combustion engine 1 having an exhaust side 2 and an intake side 3. The internal combustion engine 1 may be embodied as a single or a multi-cylinder engine, it being naturally also possible to configure the internal combustion engine as a V-engine or in some other form. The exemplary embodiment shown relates to a diesel engine, but is not intended to be limited to diesel engines.

The increase in the exhaust gas temperature in this exemplary internal combustion engine is achieved by a control method, which is described further below.

An exhaust pipe 4, which delivers the exhaust gases produced in the internal combustion engine 1 to a turbocharger 6 or to its turbine side 7, is assigned to the exhaust side 2, the exhaust gases flowing through the turbine side 7. From the turbine side 7 the exhaust gases flow into an exhaust tract 8, in which a catalytic converter 9, a diesel particle filter or particle filter 11 and a silencer 12 are arranged in series.

On the opposite side to the turbine side 7 the turbocharger 6 has a compressor side 13, the turbine side 7 being connected to the compressor side 13 by a shaft 14.

Opening into the compressor side 13 is a fresh air line 16, which delivers fresh air flowing through an air filter 17 to the compressor side 13.

Opening into the fresh air line 16, moreover, is an exhaust gas recirculation line 18 (EGR line), which extracts exhaust gases from the exhaust tract 8 downstream of the turbine side 7, or in the exemplary embodiment shown downstream of the diesel particle filter 11, and leads it to the fresh air line 16. Upstream of an EGR valve 19 a heat exchanger may be assigned to the exhaust gas recirculation line 18, in order to avoid the disadvantages associated with excessively high temperatures of the fresh air/exhaust gas mixture on the inlet side of the compressor. This heat exchanger may suitably have a device for draining the condensate upstream of the compressor.

The fresh air and the recirculated exhaust gases mix with one another in fresh air line 16 and flow into the compressor side 13 of the turbocharger 6 and are fed into an intake line 21 on the inlet side.

A cooling element 22 is incorporated in the intake line 21, so that the exhaust gases mixed with the fresh air and/or the fresh combustion gases are cooled in the intake line 21 or inside the intake line 21. The cooling element 22 takes the form of a combined cooler. A valve 23 is moreover assigned to the intake line 21, in order to close the intake line 21, when the internal combustion engine is switched off.

A regulating system 24 is arranged in the exhaust tract 8 downstream of the exhaust gas recirculation line 18 in order to regulate the exhaust gas back-pressure and the exhaust gas recirculation. In the exemplary embodiment shown the regulating system 24 is arranged upstream of the silencer 12. The regulating system 24 has a flap valve 26 integrated into the exhaust tract 8 and a bypass 27 arranged in the area of the flap valve 26, in which bypass a valve 28 is arranged. This exemplary embodiment for regulating the exhaust gas back-pressure is obviously not limited to the system described, it being possible to use all suitable systems for controlling the exhaust gas back-pressure. The regulating system 24 arranged in the exhaust tract 8 may advantageously be used during the regeneration phase of the particle filter 11 or of the diesel particle filter, and is capable of increasing the exhaust gas back-pressure, thereby serving, for example, to reduce any engine oil dilution due to retarded post-injection(s) or retarded diesel post-injection(s). The regulating system can naturally also be used to increase the exhaust gas temperature, in order to bring the catalytic converter up to its operating temperature more rapidly after cold-starting of the internal combustion engine. However, the increase in the exhaust gas back-pressure also makes it possible to achieve a more stable exhaust gas recirculation.

The intake line 21 opens into the inlet side of an air distributor (not shown), in order to supply the individual cylinders with the required air flow and/or the required quantity of combustion gases.

Figure 2:
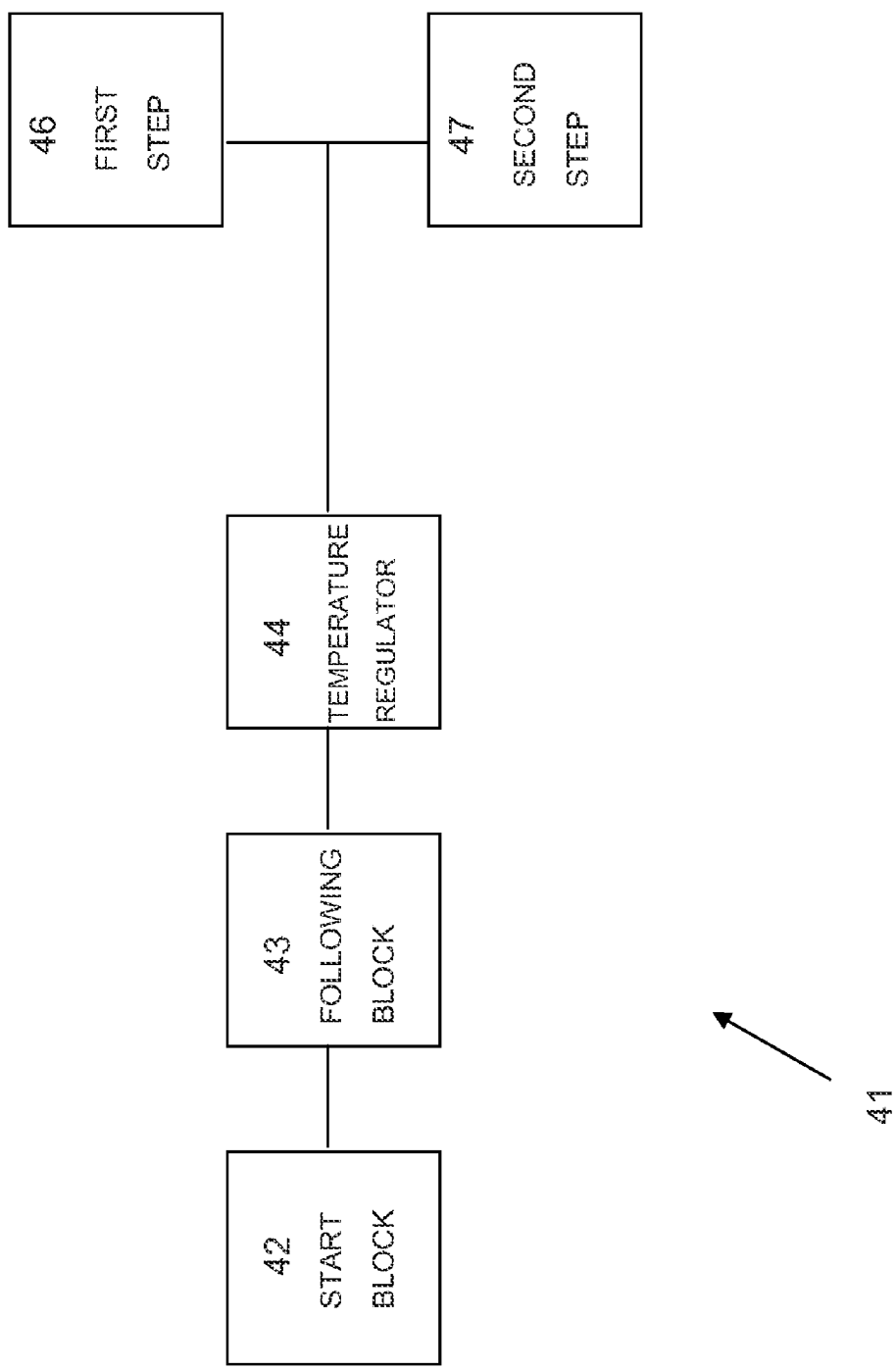
FIG. 2 shows a flowchart of the control method for increasing the exhaust gas temperature.

FIG. 2 basically shows a flow chart for increasing the exhaust gas temperature by the control method 41 according to the invention. In a start block 42 the actual exhaust gas temperature is first determined. In a following block 43 it is determined what exhaust gas temperature is necessary. This necessary exhaust gas temperature is determined according to whether the catalytic converter 9 is to be brought up to its operating temperature, or whether the particle filter 11 is to be regenerated. The value of both exemplary exhaust gas temperatures naturally varies. In order to attain the operating temperature of the catalytic converter 9, particularly after cold-starting of the internal combustion engine, a lower exhaust gas temperature is required than for regeneration of the particle filter 11.

The setting for the exhaust gas temperature determined in block 43 is delivered to a temperature regulator 44 in order to increase the exhaust gas temperature, in which ambient influences, such as signals relating to the ambient temperature, also a play a part. Following the temperature regulator 44, the method is divided into a first step 46 and a second step 47. The two steps 46 and 47 may be performed in parallel and/or separately of one another.

In the first step 46, the increase in the exhaust gas temperature is achieved in that the exhaust gas back-pressure is increased by the regulating system 24, whilst maintaining an exhaust gas recirculation rate, and that in the first step 46 a quantity of fuel injected into the combustion chamber is increased during the main injection. In the second step 47, the increase in the exhaust gas temperature is achieved in that the main injection is deferred to a later time, if the required exhaust gas temperature is not achieved by means of the first step 46.

The increase in the exhaust gas temperature is only for a limited time, so that after reaching the operating temperature of the catalytic converter 9 or after regeneration of the particle filter 11 has been completed there is a return to the original operating parameters of the internal combustion engine.

For the first step 46, the two valves 19 and 28 are regarded in design terms as a single valve 48 (FIG. 3), which has an aggregate area, which is actually composed of the respective constituent areas of the two valves 19 and 28. This approach is based on the finding that a pressure drop over the two valves 19 and 28 is more or less equivalent, and that controlling the distribution of the opened and closed constituent areas of the two valves 19 and 28 is virtually equivalent to controlling the exhaust gas recirculation rate.

Figure 4:
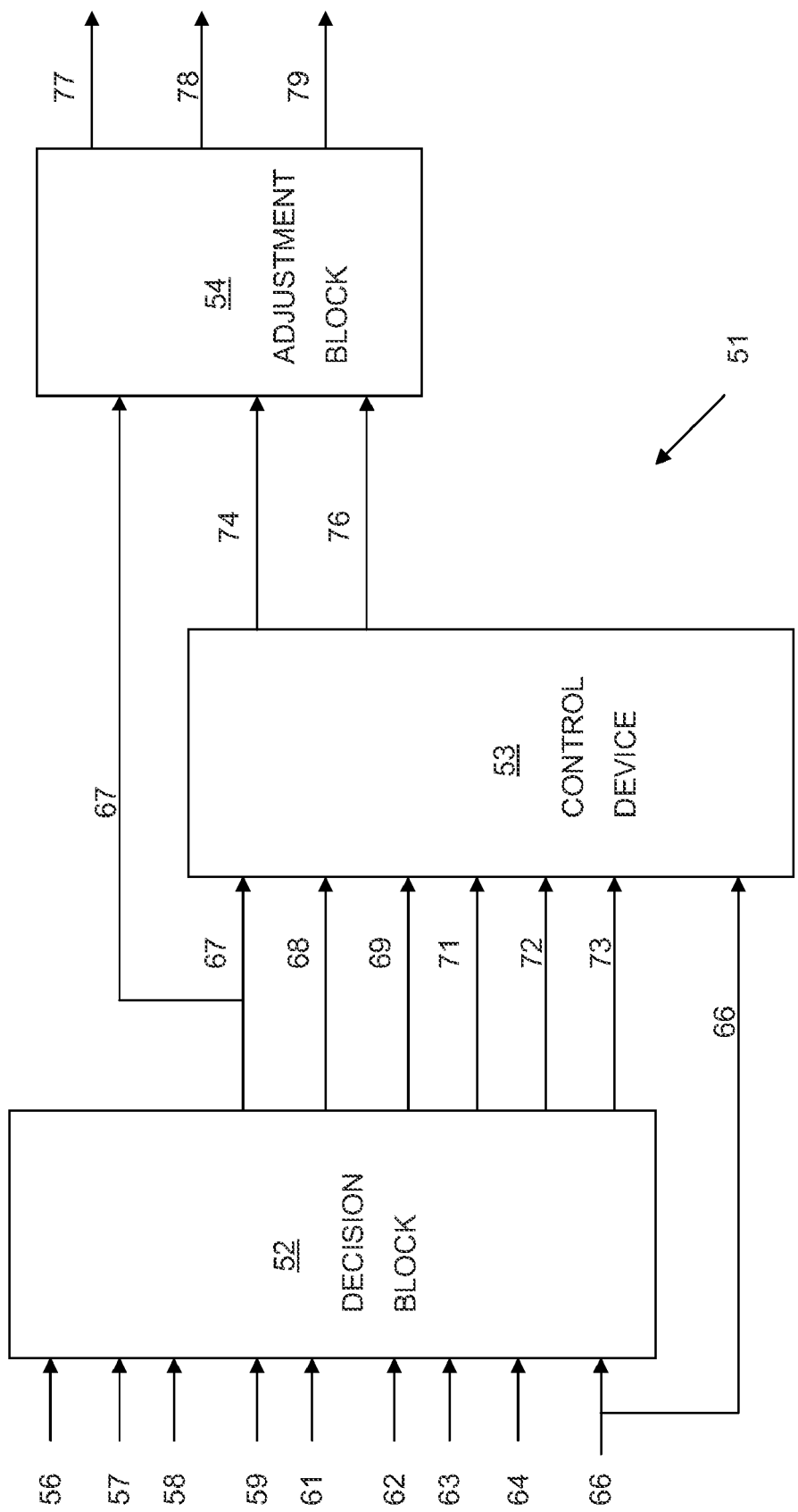
FIG. 4 shows a schematic representation of a partial control structure for increasing the exhaust gas temperature.

The first step 46, for increasing the exhaust gas temperature by means of the regulating system 24, is represented, by way of example, in the control structure 51 according to FIG. 4.

The control structure 51 preferably has a decision block 52, a control device 53 and an adjustment block 54. In the first step 46, input parameters such as an increase 56 in the exhaust gas back-pressure setting, the turbine mass flow 57, the ambient pressure 58, the temperature downstream of the diesel particle filter 59, the measured exhaust gas back-pressure 61, the setting for the exhaust gas recirculation rate 62, the estimated mass flow through the engine (fresh air+exhaust gas) 63, the estimated exhaust gas recirculation rate 64 and a signal 66 for an updating of the aforementioned input parameters are fed to the decision block 52. From these the decision block 52 generates decision signals such as, for example, activation 67 of the two valves, aggregate area setting 68 of the two valves for a required degree of opening, measured aggregate area 69 of the two valves for a required degree of opening, setting for the distribution 71 of the two valve areas for a required degree of opening, estimated value of the distribution 72 of the two valve areas for a required degree of opening, activation 73 of the exhaust gas recirculation valve, if the exhaust gas recirculation rate should be greater than zero, or deactivation 73 of the exhaust gas recirculation valve, if the exhaust gas recirculation rate should be zero.

These decision signals are delivered to the control device 53 together with the updating signal 66. The updating signal 66 serves to ensure that the current operating conditions are constantly incorporated into the control structure 51. The updating interval is preferably in the order of milliseconds. For example, the required values might be updated every ten milliseconds.

From the decision signals delivered, the control device 53 generates control signals for controlling the aggregate area 74 of the two valves and a control signal for the distribution 76 of the aggregate area between the two valves.

The control signals 74 and 76 are delivered, together with the adjustment signal 67 for activation of the two valves, to the adjustment block 54, which from these generates adjustment signals, such as signals for closing 77 of the flap valve, opening 78 of the valve 28 in a range between 0% and 100% and opening 79 of the exhaust gas recirculation valve 19 in a range between 0% and 100%. The adjustment signals 78 and 79 are relayed to the corresponding valve 19 and 28. This causes the exhaust gas back-pressure to rise, while maintaining the exhaust gas recirculation rate. At the same time, however, this results in a decline in performance, which can be counteracted by simultaneously increasing the fuel injection quantity during the main injection, which in turn raises the exhaust gas temperature.

If the required exhaust gas temperature it not achieved by means of the first step 46, in the ensuing second step 47, the exhaust gas temperature is increased by deferring the main injection to a later time. This reduces the efficiency of the internal combustion engine further, which is why the fuel injection quantity is increased again during the main injection.

The following values are intended to illustrate one example of the control method:

In the first step 46, it is determined that the exhaust gas temperature has not reached the required level, so that the exhaust gas back-pressure, for example, has to be increased to two bar (three bar). This necessitates a 20% (30%) increase in the fuel injection quantity during the main injection, for example. If this measure is not sufficient, the main injection is deferred to a later time, for example to a time shortly before or shortly after the top dead center, depending on what temperature is to be attained. This in turn necessitates a 10% increase in the fuel injection quantity, for example, so that the driver does not notice the decline in performance. The amount of the additional fuel injection quantity depends on how long the main injection is deferred. A smaller additional amount needs to be injected, if the main injection is deferred until shortly before the top dead center, while a greater additional amount should be injected, if the main injection is deferred to a time after the top dead center. Once the required exhaust gas temperature has been reached, that is to say the catalytic converter 9 has reached its operating temperature, or if the regeneration of the particle filter 11 has been completed, there is a return to the original parameters.

It is naturally consistent with the idea of the invention to defer the main injection to a later time in order to increase the exhaust gas temperature after cold-starting. If the ambient temperature or the cooling water temperature is so low, however, that smooth running of the engine could not be ensured, for example, this is not advisable. It would therefore be advantageous to perform the first step 46 as a preliminary to performing the second step 47.

If the required exhaust gas temperature is not attained by means of the two steps 46 and 47, a post-injection may be performed. The measures according to the invention mean that this post-injection can advantageously be situated closer to the time of the main injection than in the state of the art, since the crankshaft output remains constant owing to the increased exhaust gas back-pressure, in combination with the higher internal output inside the engine. The oil dilution effect can thereby be eliminated or at least greatly reduced.

What is claimed is:

1. A system for increasing a temperature of an exhaust gas of an internal combustion engine, comprising:
    at least one exhaust gas aftertreatment device coupled downstream of the engine;
    an exhaust gas recirculation system comprising:
        an exhaust gas recirculation valve;
        an exhaust gas recirculation line coupling the exhaust to an intake of the engine; and
        a regulating system for controlling an exhaust gas back-pressure coupled in the exhaust gas downstream of the exhaust gas recirculation line; and
    a control device for increasing said exhaust gas back-pressure while maintaining a substantially constant exhaust gas recirculation rate, said control device increasing a fuel injection quantity into a combustion chamber of the engine during a main injection event, wherein said control device defers said main injection event to a later time if a required exhaust gas temperature is not achieved, and wherein said regulating system comprises:
    a flap valve integrated into an engine exhaust tract; and
    a bypass tract for bypassing the area of the flap valve, said bypass tract having a bypass valve incorporated in it, wherein the degrees of opening of the exhaust gas recirculation valve, the flap valve and the bypass valve are jointly controlled so that a desired exhaust gas back-pressure setting and a desired exhaust gas recirculation rate setting are achieved.

2. An engine method, comprising:
    increasing an aftertreatment device temperature by increasing exhaust back-pressure downstream of a low-pressure EGR system line, while:
        maintaining a substantially constant low-pressure EGR rate;
        increasing a main fuel injection quantity into an engine cylinder; and
        post-injecting fuel, an opening degree of an EGR valve, a back-pressure flap-valve, and a back-pressure bypass-valve around the flap-valve are jointly controlled to achieve a desired exhaust gas back-pressure setting and the constant EGR rate.

3. The method of claim 2 wherein the aftertreatment device is a particulate filter.

4. The method of claim 3 wherein the particulate filter is regenerated during the increased temperature.

5. The method of claim 4 wherein a main injection event is retarded if a required exhaust gas temperature is not achieved.

* * * * *